United States Patent
Sheng et al.

(10) Patent No.: US 12,545,624 B2
(45) Date of Patent: Feb. 10, 2026

(54) BISMUTH SODIUM POTASSIUM TITANATE-BARIUM TITANATE-BASED COMPOSITE CERAMIC MATERIAL WITH HIGH DEPOLARIZATION TEMPERATURE AND PREPARATION METHOD THEREOF

(71) Applicants: PKU-HKUST Shenzhen-Hong Kong Institution, Shenzhen (CN); Shenzhen Institute, Peking University, Shenzhen (CN)

(72) Inventors: Liyuan Sheng, Shenzhen (CN); Min Wen, Shenzhen (CN); Xingru Zhang, Shenzhen (CN); Yinan Xiao, Xinxiang (CN); Qiaoli Wang, Shenzhen (CN); Chen Lai, Shenzhen (CN)

(73) Assignees: PKU-HKUST Shenzhen-Hong Kong Institution, Shenzhen (CN); Shenzhen Institute, Peking University, Shenzhen (CN)

( * ) Notice: Subject to any disclaimer, the term of this patent is extended or adjusted under 35 U.S.C. 154(b) by 462 days.

(21) Appl. No.: 18/307,629

(22) Filed: Apr. 26, 2023

(65) Prior Publication Data
US 2024/0043339 A1    Feb. 8, 2024

(30) Foreign Application Priority Data
Aug. 4, 2022  (CN) .......................... 202210932514.5

(51) Int. Cl.
| | | |
|---|---|---|
| *C04B 35/475* | (2006.01) |
| *C04B 35/468* | (2006.01) |
| *C04B 35/626* | (2006.01) |
| *C04B 41/00* | (2006.01) |
| *C04B 41/51* | (2006.01) |
| *C04B 41/88* | (2006.01) |
| *C04B 41/91* | (2006.01) |

(52) U.S. Cl.
CPC .......... *C04B 35/475* (2013.01); *C04B 35/468* (2013.01); *C04B 35/6262* (2013.01); *C04B 41/0072* (2013.01); *C04B 41/5116* (2013.01); *C04B 41/88* (2013.01); *C04B 41/91* (2013.01); *C04B 2235/3236* (2013.01); *C04B 2235/3284* (2013.01); *C04B 2235/408* (2013.01); *C04B 2235/604* (2013.01)

(58) Field of Classification Search
CPC ....... B29C 67/242; B29C 48/05; B29C 48/28; B29C 64/209; B29C 64/153
See application file for complete search history.

(56) References Cited

FOREIGN PATENT DOCUMENTS

| | | |
|---|---|---|
| CN | 101381231 A | 3/2009 |
| CN | 104788093 A | 7/2015 |
| CN | 106518058 A | 3/2017 |
| CN | 114031395 A | 2/2022 |
| JP | 2001151566 A | 6/2001 |

*Primary Examiner* — Stella K Yi
(74) *Attorney, Agent, or Firm* — Pilloff Passino & Cosenza LLP; Rachel Pilloff; Sean Passino

(57) ABSTRACT

Disclosed are a bismuth sodium potassium titanate-barium titanate (BNKT-BT)-based composite ceramic material with high depolarization temperature and a preparation method thereof, belonging to the technical field of piezoelectric ceramics of electronic materials. The chemical general formula of the BNKT-BT based composite ceramic material is: $0.85(Bi_{0.5}Na_{0.5})TiO_3\text{-}0.11(Bi_{0.5}K_{0.5})TiO_3\text{-}0.04BaTiO_3\text{-}xZnO$, where $0.1 \leq x \leq 0.3$. The composite ceramic material takes BNKT-BT ceramics as the substrate, and single-phase ZnO is embedded in the middle of the substrate to form a 0-3 composite structure.

8 Claims, 11 Drawing Sheets

BISMUTH SODIUM POTASSIUM TITANATE-BARIUM TITANATE-BASED COMPOSITE CERAMIC MATERIAL WITH HIGH DEPOLARIZATION TEMPERATURE AND PREPARATION METHOD THEREOF

CROSS-REFERENCE TO RELATED APPLICATIONS

This application claims priority to Chinese Patent Application No. 202210932514.5, filed on Aug. 4, 2022, the contents of which are hereby incorporated by reference.

TECHNICAL FIELD

The present application belongs to the technical field of piezoelectric ceramics of electronic materials, and particularly relates to a bismuth sodium potassium titanate-barium titanate (BNKT-BT)-based composite ceramic material with high depolarization temperatures and a preparation method thereof.

BACKGROUND

Information interaction using different forms of energy as carriers is becoming more frequent with the emergence of new applications such as the Internet of Things, whereby high-performance functional materials are crucial to ensure reliable interaction. Piezoelectric ceramic is a special class of functional materials, it is widely used in a variety of devices such as oscillators and filters to achieve electro-acoustic coupling through the piezoelectric effect, whereby electrical energy and mechanical energy enabled to convert mutually. In the current trend towards miniaturization of devices, the precision control technology of miniscule displacements accomplished by piezoelectric ceramics provides basis for the integration of microelectromechanical systems, and the broad application has given rise to a large commercial market for piezoelectric ceramics, with lead-containing ceramics occupying the vast majority of this market thanks to their excellent electrical properties. However, the manufacturing and waste disposal processes have resulted in the serious contamination of the ecological environment by the release of toxic lead elements, despite the technological advances made possible by the widespread application of lead-based ceramics. In the wake of legislation passed by major countries and organizations around the world to restrict the use of lead-based ceramics, the development of new lead-free alternatives has become an urgent priority for the relevant industries.

Among many alternative lead-free materials available, perovskite type $((Bi_{0.5}Na_{0.5})TiO_3$ (BNT)) based ceramics are considered to be one of the most promising lead-free systems due to their excellent electromechanical coupling properties. Yet, there is one serious problem as using BNT-based ceramics under rising temperatures, namely, the depolarization; it is a phenomenon caused by the transformation of the ceramic from the ferroelectric phase to the all-pervasive relaxation phase, whereby the unstable electric domains in ceramics are continuously decomposed during the heating process until the polarization disappears; quantitative measurements of the depolarization properties may be made by comparing the depolarization temperature, $T_d$, which reflects the high temperature limit at which the ceramic can retain its weak piezoelectricity. Numerous studies have shown that the depolarization temperature of typical BNT-based ceramics is mostly below 100 degrees Celsius (° C.), and how to increase the depolarization temperature has therefore become a pressing challenge in the practising of BNT-based ceramics for piezoelectric applications.

It is an important fundamental problem in the field of lead-free piezoelectric ceramics to determine the cause of depolarization in BNT-based ceramics, and one generally accepted theory in the materials science community is that the depolarization temperature is related to the random field caused by lattice distortion. Since conventional modifications such as solid solution and doping usually exacerbate the lattice distortion and the alteration of the local random electric field, such modification methods are often unable to increase the depolarization temperature.

SUMMARY

In view of the fact that conventional doping and solid solution modification methods fail to effectively increase the depolarization temperature of $(Bi_{0.5}Na_{0.5})TiO_3$ (BNT)-based ceramics, the present application provides a bismuth sodium potassium titanate-barium titanate (BNKT-BT)-based composite ceramic material with a high depolarization temperature and a preparation method thereof. The composite ceramic material consists of BNKT-BT ceramic as a substrate and single-phase ZnO embedded in the middle of the substrate to form a 0-3 type composite structure. The composite ceramic material has a high depolarization temperature and good piezoelectric properties, and its leakage current effect is well suppressed.

To achieve the above objectives, the present application proposes the following technical scheme:

a BNKT-BT-based composite ceramic material with high depolarization temperature, where the composite ceramic material has a chemical general formula of $0.85(Bi_{0.5}Na_{0.5})TiO_3$-$0.11(Bi_{0.5}K_{0.5})TiO_3$-$0.04BaTiO_3$-xZnO, and $0.1 \leq x \leq 0.3$.

According to the present application, a BNKT-BT substrate is firstly formed by solid solution of a tetragonal phase BKT and BT with a tripartite phase BNT at room temperature, and then mixed and sintered with ZnO nanoparticles to form a 0-3 type composite structure; the prepared composite ceramic material retains a tripartite-tetragonal quasi-homotypic phase boundary and has better piezoelectric properties.

The present application also provides a preparation method of the BNKT-BT-based composite ceramic material with high depolarization temperatures, including following steps:

S1, mixing a bismuth source, a sodium source, a potassium source, a titanium source and a barium source into a slurry according to a stoichiometric ratio by a wet ball milling method, with an organic solvent as a medium, taking out the slurry after ball milling, drying the slurry to obtain a fully mixed raw material powder, followed by ball milling then dry-pressing for molding in a tablet press to obtain a raw material block;

S2, pre-sintering the raw material block in an oxygen atmosphere to obtain a BNKT-BT pre-sintered block;

S3, grinding the BNKT-BT pre-sintered block to obtain BNKT-BT pre-sintered powder, then mixing the BNKT-BT pre-sintered powder with ZnO nanoparticles according to the stoichiometric ratio, followed by secondary ball milling and drying to obtain mixed powder, then adding an adhesive, standing, and pressing to obtain a sample;

S4, grinding the pressed sample and sieving to obtain powder, then re-pressing the obtained powder obtain a ceramic blank;

S5, sequentially heating, sintering, grinding and polishing the ceramic blank to obtain ZnO composite BNKT-BT-based ceramics; and S6, coating silver paste on a surface of the ZnO composite BNKT-BT-based ceramics, and performing silver-firing to obtain BNKT-BT-based composite ceramic material with high depolarization temperature.

Optionally, the dry-pressing in S1 is carried out under pressure of 400 megapascal (Mpa) for a duration of 1-3 minutes (min).

Optionally, the pre-sintering in S2 is carried out under temperature of 820-850 degrees Celsius (° C.) for a duration of 3-4 hours (h).

Optionally, the ZnO nanoparticles in S3 are in a diameter of 50-80 nanometers (nm).

Optionally, in S3, the adhesive is a 5 weight percentage (wt %) polyvinyl alcohol adhesive; the standing is lasted for 12-15 h, and the pressing to obtain the sample is carried out under pressure of 600 MPa for a duration of 3-6 min.

Optionally, the re-pressing in S4 is carried out under pressure of 400 Mpa for a duration of 1-3 min.

Optionally, in S5, the heating includes temperature of 550° C. and duration of 2-3 h; and the sintering includes temperature of 1,030-1,070° C. and duration of 1-1.5 h, with a heating rate of 9° C./min.

Optionally, the silver-firing in S6 is carried out under temperature of 550-600° C. for a duration of 40-50 min.

Compared with the prior art, the present application has the beneficial effects that:

the tripartite-tetragonal phase boundary existing in the BNKT-BT substrate is maintained according to the present application, resulting in a well preserved piezoelectric property of the substrate material;

the electric domain is stabilized by the pegging effect of the grain boundary stress field near the ZnO enriched region and the depolarization behavior of the substrate is significantly improved, with an increase of about 60° C. in the depolarization temperature of the ZnO composite ceramic material compared to that of the pure substrate material; and the present application has a broad market application prospect, it adopts the solid phase reaction method for preparation with an easy to control process, good repeatability, better control of the heterogeneous phase; the finished composite ceramic material meets the requirements of the electronic ceramic material industry, with an depolarization temperature higher than 120° C., and the piezoelectric properties maintaining a good temperature stability below 110° C.

For a clearer illustration of the technical schemes in the embodiments of the present application or in the prior art, a brief description of the accompanying drawings to be used in the embodiments are given below. It is obvious that the accompanying drawings in the following description are only some embodiments of the present application and that other accompanying drawings are available to those of ordinary skill in the art without any creative effort.

BRIEF DESCRIPTION OF THE DRAWINGS

FIG. 2A shows morphological phases, FIG. 2B shows Ti elemental distribution, FIG. 2C illustrates Bi elemental distribution, and FIG. 2D illustrates Zn elemental distribution.

DETAILED DESCRIPTION OF THE EMBODIMENTS

Various exemplary embodiments of the present application are described in detail and this detailed description should not be considered as limiting the present application, but should be understood as a more detailed description of certain aspects, features and embodiments of the present application.

It is to be understood that the terms described in the present application are intended to describe particular embodiments only and are not intended to limit the application. Further, with respect to the range of values in the present application, it is to be understood that each intermediate value between the upper and lower limits of the range is also specifically disclosed. Each smaller range between any stated value or intermediate value within a stated range and any other stated value or intermediate value within a stated range is also included in the present application. The upper and lower limits of these smaller ranges may be independently included or excluded from the scope.

Unless otherwise stated, all technical and scientific terms used herein have the same meaning as commonly understood by those of ordinary skill in the field described in the present application. Although the present application describes only preferred methods and materials, any methods and materials similar or equivalent to those described herein may also be used in the implementation or testing of the present application. All literature referred to in this specification is incorporated by reference for the purpose of disclosing and describing the methods and/or materials associated with said literature. In the event of conflict with any incorporated literature, the contents of this specification shall prevail.

Without departing from the scope or spirit of the present application, a variety of improvements and variations can be made to specific embodiments of the specification of the present application, as will be apparent to those skilled in the art. Other embodiments obtained from the specification of the present application are obvious to the skilled person. The present specification and embodiments are exemplary only.

The terms "including", "comprising", "having" and "containing" used in this specification are all open terms, which means including but not limited to.

A BNKT-BT-based composite ceramic material with high depolarization temperature, and the BNKT-BT-based composite ceramic material has a chemical general formula of $0.85(Bi_{0.5}Na_{0.5})TiO_3\text{-}0.11(Bi_{0.5}K_{0.5})TiO_3\text{-}0.04BaTiO_3$ (BNKT-BT)-xZnO, where $0.1 \leq x \leq 0.3$.

According to the present application, a BNKT-BT substrate is firstly formed by solid solution of a tetragonal phase BKT and BT with a tripartite phase BNT at room temperature, and then mixed and sintered with ZnO nanoparticles to form a 0-3 type composite structure; the prepared composite ceramic material retains a tripartite-tetragonal quasi-homotypic phase boundary and has better piezoelectric properties.

Figure 5:
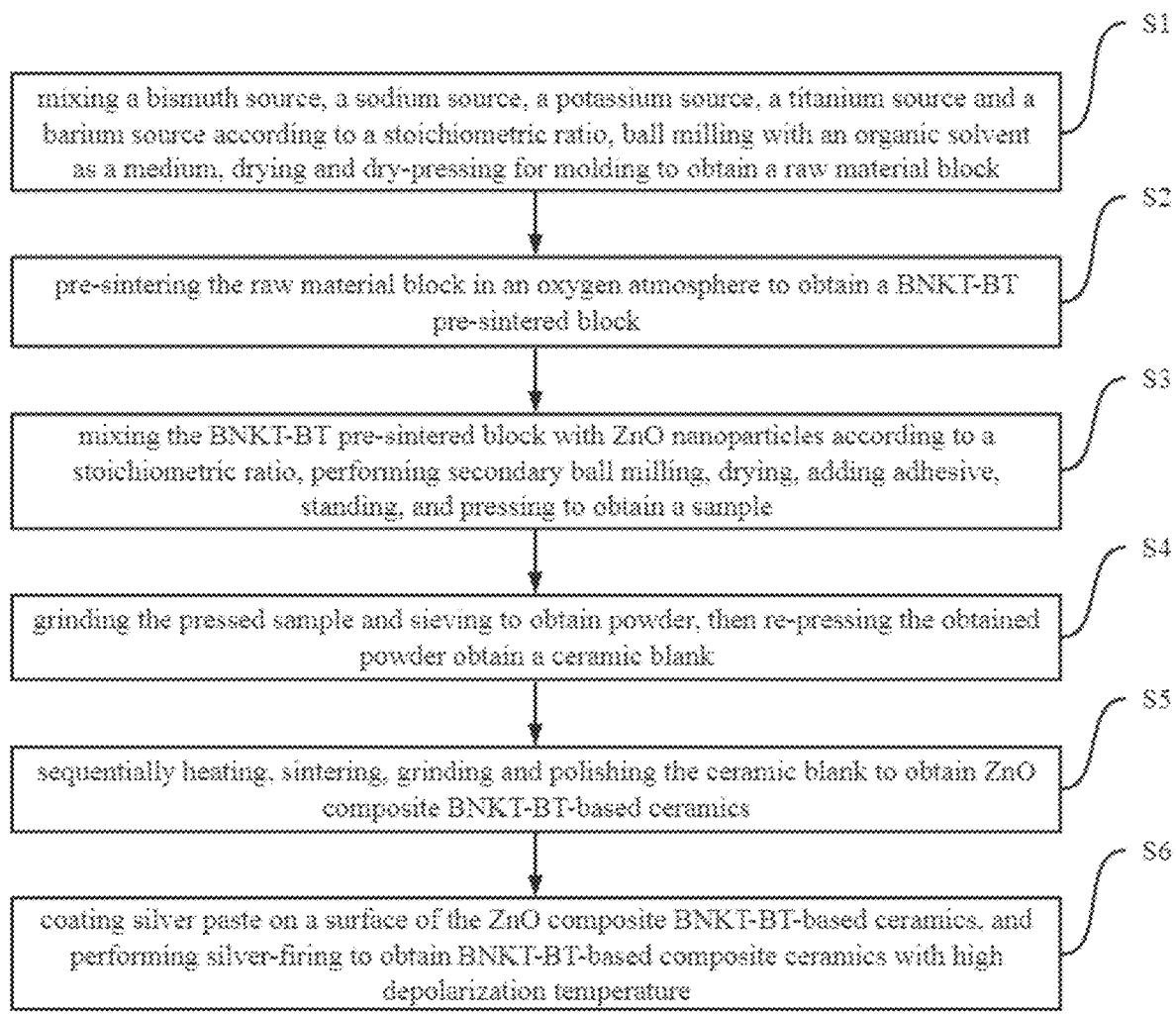
FIG. 5 is a process illustrating a preparation method of a BNKT-BT-based composite ceramic material with high depolarization temperature according to the present application.

Referring to FIG. 5, the present application also provides a preparation method of the BNKT-BT-based composite ceramic material with high depolarization temperature, including the following steps:

S1, mixing a bismuth source, a sodium source, a potassium source, a titanium source and a barium source into a slurry according to a stoichiometric ratio by a wet ball milling method for a duration of 20-24 hours (h) with a rotating speed of 300-400 revolutions per minute (rpm), with an organic solvent as a medium; then taking out the slurry after ball milling, pouring the slurry into a glass culture dish and drying for 3 h, with a temperature of a drying box being 105 degrees Celsius (° C.), then obtaining dried raw material powder; pressing that raw material powder into a circular disc in a tablet press, where the circular disc has a diameter of 30 millimeters (mm) and a thickness of 10 mm, the pressing is carried out under pressure of 400 megapascal (MPa) with pressure being kept for a duration of 1-3 min, preferably 1 min, to obtain a raw material block;

the ball milling uses ball of onyx material, with diameters of large, medium and small balls of 20 mm, 10 mm and 6 mm respectively, and the balls of three sizes are in a ratio of large balls:medium balls:small balls=1:20:60;

the bismuth source is $Bi_2O_3$, the sodium source is $Na_2CO_3$, the potassium source is $K_2CO_3$, the titanium source is $TiO_2$, the barium source is $BaCO_3$, and the organic solvent is anhydrous ethanol (with an addition amount of 30-50 percent (%) of a total volume of the powder, preferably 40%);

S2, putting the raw material block into a box-type low-temperature reaction furnace, increasing temperature to 820-850° C. at a rate of 3° C./min, and pre-sintering for 3-4 h, preferably 3 h, in an oxygen atmosphere to obtain a BNKT-BT pre-sintered block;

S3, grinding the obtained BNKT-BT pre-sintered block to obtain BNKT-BT pre-sintered powder, then mixing the BNKT-BT pre-sintered powder with ZnO nanoparticles (with an average diameter of 50-80 nanometers (nm), preferably 50 nm) according to the stoichiometric ratio, performing secondary ball milling for 12 h (the ball ratio and ball milling parameters are the same as those in S1), and drying to obtain mixed powder; and adding 5 weight percentage (wt %) polyvinyl alcohol adhesive into the mixed powder at a speed of 2-3 drops per gram (drops/g), fully stirring, standing for 12-15 h, preferably for 12 h, and then pressing the powder into a disc with a diameter of 30 mm, a thickness of 10 mm at a pressure of 600 MPa for a duration of 3-6 min, preferably 5 min;

S4, grinding the pressed sample and sieving to obtain powder with a sieve meeting requirements of GB/T6003.1-2012, with only the powder with a diameter of 75-106 micrometers (μm) is reserved; pressing the obtained powder into a disc with a diameter of 13 mm, a thickness of 1 mm at a pressure of 400 Mpa for a duration of 1-3 min, preferably 1 min, and slowly depressurizing and demoulding to obtain a ceramic blank;

S5, placing the ceramic blank in a low-temperature reaction furnace, raising the temperature to 550° C. at a rate not higher than 2° C./min and keeping the temperature for 2-3 h, and discharging water vapor and organic matters in the ceramic blank to obtain the ceramic blank after discharging water vapor and organic matters; and placing the ceramic blank after discharging water vapor and organic matters in a high-temperature reaction furnace for high-temperature sintering, rapidly raising the temperature to 1,030-1,070° C. at a rate of 9° C./min and keeping the temperature for 1-1.5 h, and then naturally cooling to room temperature to obtain a ceramic sheet;

among them, the temperature is 1,050-1,070° C. when $0.1 \leq x < 0.2$, and the temperature is 1,030-1,050° C. when $0.2 \leq x \leq 0.3$;

polishing a surface of the ceramic sheet to obtain ZnO composite BNKT-BT-based ceramics; and S6, coating high-temperature silver paste on the surface of ZnO composite BNKT-BT-based ceramics, and performing silver-firing at 550-600° C. (preferably 560° C.) for 40-50 min, preferably 40 min to obtain BNKT-BT-based composite ceramic material with high depolarization temperature.

In an optimized embodiment, the ZnO nanoparticles in the S3 are in a diameter of 50 nm.

The raw materials used in the present application are $Bi_2O_3$ (Alfa Aesar, 99.9%), $Na_2CO_3$ (Acros Organics, 99%), $TiO_2$ (Acros Organics, 99%), $BaCO_3$ (Alfa Aesar, 99%), $K_2CO_3$ (Acros Organics 99.9%), ZnO (Aladdin, 99.9% and 50 nm), and anhydrous ethanol.

Embodiment 1

A $0.85(Bi_{0.5}Na_{0.5})TiO_3\text{-}0.11(Bi_{0.5}K_{0.5})TiO_3\text{-}0.04BaTiO_3\text{-}xZnO$ composite ceramic material is synthesized, where x=0.1, and the specific implementation method is as follows:

S1, using $Bi_2O_3$, $TiO_2$, $Na_2CO_3$, $K_2CO_3$, and $BaCO_3$ as initial raw materials, weighing according to the stoichiometric ratio, subjecting to wet ball milling at a rotating speed of 300 rpm for 20 h with anhydrous ethanol (40% of the total powder volume) as the medium to obtain a slurry, taking out the slurry after the ball milling, pouring the slurry into a glass culture dish and drying for 3 h, with a temperature of a drying box being 105° C., then obtaining dried raw material powder;

the ball milling uses ball of onyx material, with diameters of large, medium and small balls of 20 mm, 10 mm and 6 mm respectively, and the balls of three sizes are in a ratio of large balls:medium balls:small balls=1:20:60; and pressing the raw material powder into a circular disc in a tablet press with a diameter of 30 mm and a thickness of 10 mm under pressure of 400 MPa, keeping the pressure for 1 min, then obtaining a raw material block;

S2, putting the raw material block into a box-type low-temperature reaction furnace, increasing temperature to 820° C. at a rate of 3° C./min, and pre-sintering for 3 h in an oxygen atmosphere to obtain a BNKT-BT pre-sintered block;

S3, grinding the obtained BNKT-BT pre-sintered block to obtain BNKT-BT pre-sintered powder, then mixing the BNKT-BT pre-sintered powder with ZnO nanoparticles (with an average diameter of 50 nm) according to the stoichiometric ratio, and performing secondary ball milling for 12 h (the ball ratio and ball milling parameters are the same as those in S1)), and after ball milling, putting the slurry into a drying oven to dry to obtain mixed powder; and adding 5 wt % polyvinyl alcohol adhesive into the mixed powder at a speed of 2 drops/g, fully stirring and standing for 12 h, then pressing the powder into a circular disc with a diameter of 30 mm and a thickness of 10 mm under a pressure of 600 MPa for a duration of 5 min;

S4, grinding the pressed circular disc and sieving to obtain powder with a sieve meeting requirements of GB/T6003.1-2012, with only the powder with a diameter of 75-106 μm is reserved; pressing the obtained powder into a disc with a diameter of 13 mm, a thickness of 1 mm at a pressure of 400 MPa for a duration of 1 min, and slowly depressurizing and demoulding to obtain a ceramic blank;

S5, placing the ceramic blank in a low-temperature reaction furnace, raising the temperature to 550° C. at a rate not higher than 2° C./min and keeping the temperature for 3 h, and discharging the water vapor and organic matters in the ceramic blank to obtain the ceramic blank after discharging the water vapor and organic matters;

placing the ceramic blank after discharging water vapor and organic matters in a high-temperature reaction furnace for high-temperature sintering, rapidly raising the temperature to 1,055° C. at a rate of 9° C./min and keeping the temperature for 1.2 h, and then naturally cooling to room temperature to obtain a ceramic sheet; polishing a surface of the ceramic sheet to obtain ZnO composite BNKT-BT-based ceramics; and S6, coating high-temperature silver paste on the surface of ZnO composite BNKT-BT-based ceramics, and performing silver-firing at 560° C. for 40 min to obtain BNKT-BT-based composite ceramics (piezoelectric ceramic vibrator) with high depolarization temperature.

Embodiment 2

A 0.85$(Bi_{0.5}Na_{0.5})TiO_3$-0.11$(Bi_{0.5}K_{0.5})TiO_3$-0.04$BaTiO_3$-xZnO composite ceramic material is synthesized, where x=0.3, and the specific implementation method is the same as that in Embodiment 1, except that the temperature in S5 is 1,050° C.

Embodiment 3

Same as Embodiment 2, except that x=0.2.

Comparative Embodiment 1

A 0.85$(Bi_{0.5}Na_{0.5})TiO_3$-0.11$(Bi_{0.5}K_{0.5})TiO_3$-0.04$BaTiO_3$ composite ceramic material is synthesized, x=0, and the specific implementation method is the same as that in Embodiment 1, except that the temperature in S5 is 1,060° C.

Figure 1:
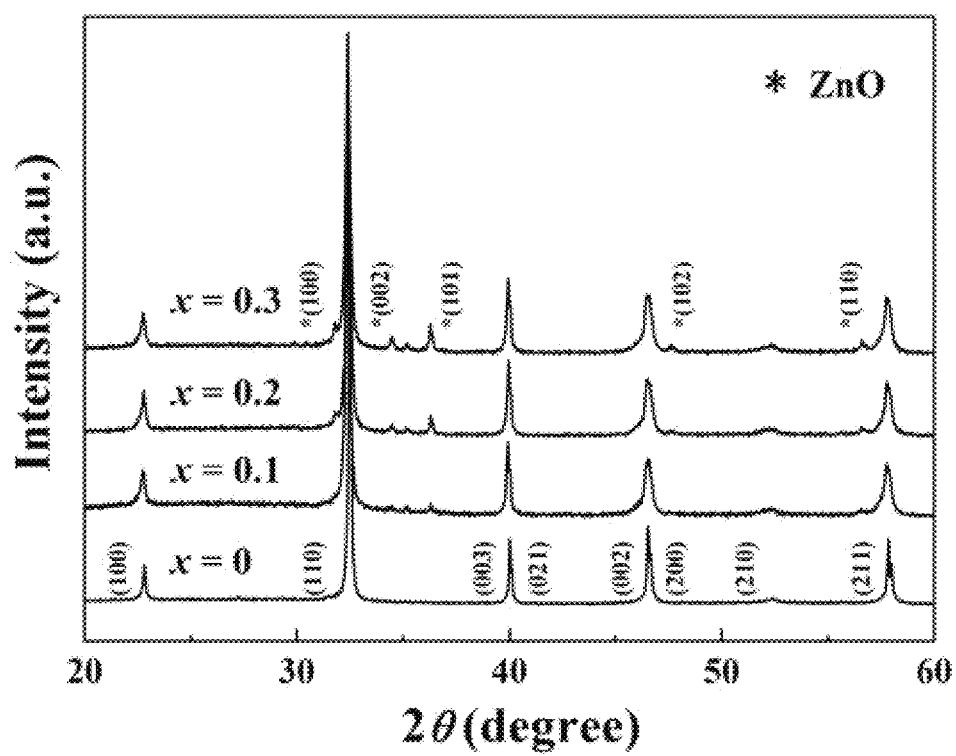
FIG. 1 is an X-ray diffraction (XRD) diagram of composite ceramic materials prepared in Embodiments 1-3 and Comparative embodiment 1.

FIG. 1 is an X-ray diffraction (XRD) diagram of the composite ceramic materials prepared in Embodiments 1-3 and Comparative embodiment 1.

As can be seen in FIG. 1, the (003) and (021) peaks splitting at diffraction angles around 40° indicate the presence of tripartite symmetry, while the (002) and (200) peaks splitting around 46° suggest the presence of tetragonal symmetry. The XRD results demonstrate that the ZnO composite ceramics maintain the tripartite-tetragonal quasi-isotropic phase boundary well.

When x=0.1, there are a few ZnO diffraction peaks with wurtzite structure in the XRD diagram, which proves the existence of single-phase ZnO;

when x=0.2 and x=0.3, the ZnO diffraction peak of wurtzite structure is obvious in the XRD diagram, and a small amount of impurities are produced; and when x=0, there is only one set of diffraction peaks of perovskite lattice in the XRD diagram, and no other impurities appear.

Figure 2A:
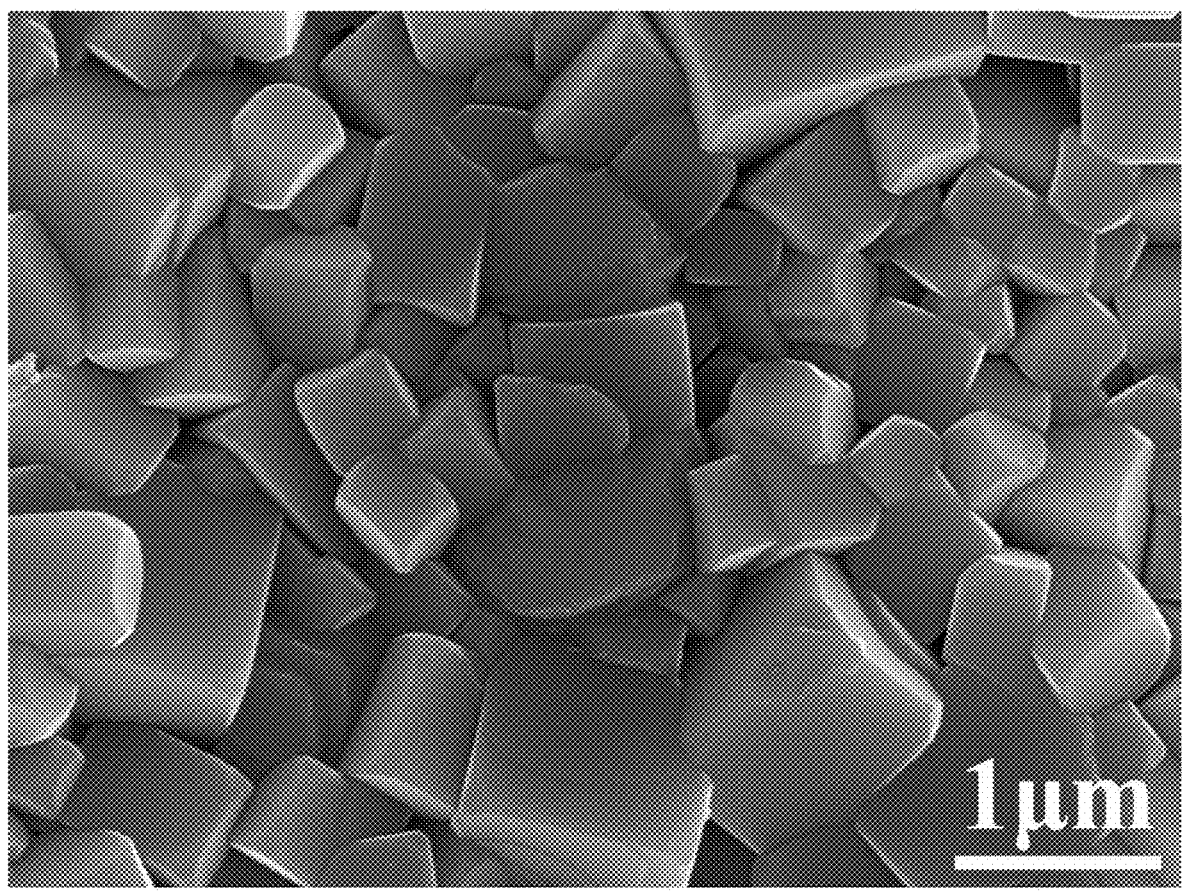
FIG. 2A, FIG. 2B, FIG. 2C and FIG. 2D illustrate results of scanning electron microscope (SEM) analysis of a 0.85 $(Bi_{0.5}Na_{0.5})TiO_3$-0.11$(Bi_{0.5}K_{0.5})TiO_3$-0.04$BaTiO_3$ (BNKT-BT)-0.3ZnO at x=0.3 in Embodiment 2, where
Figure 2B:
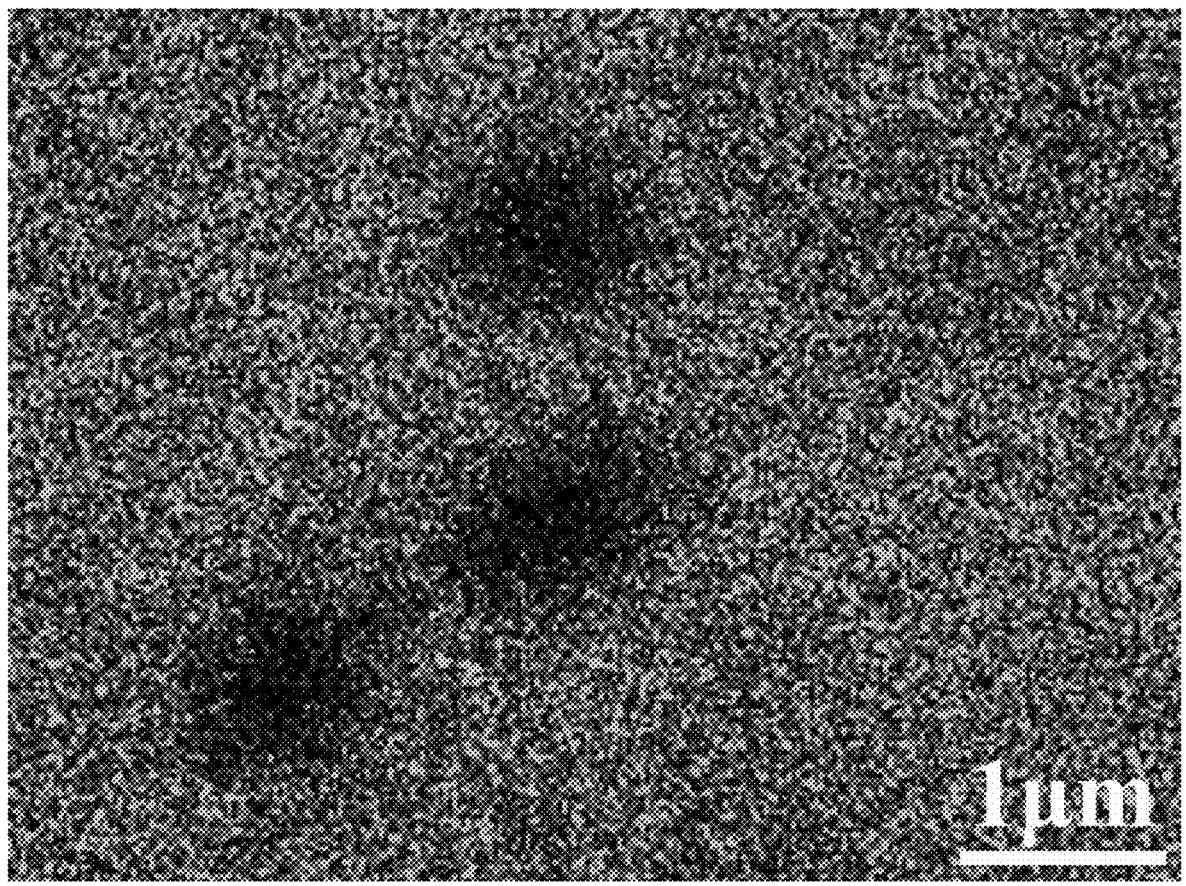
Figure 2C:
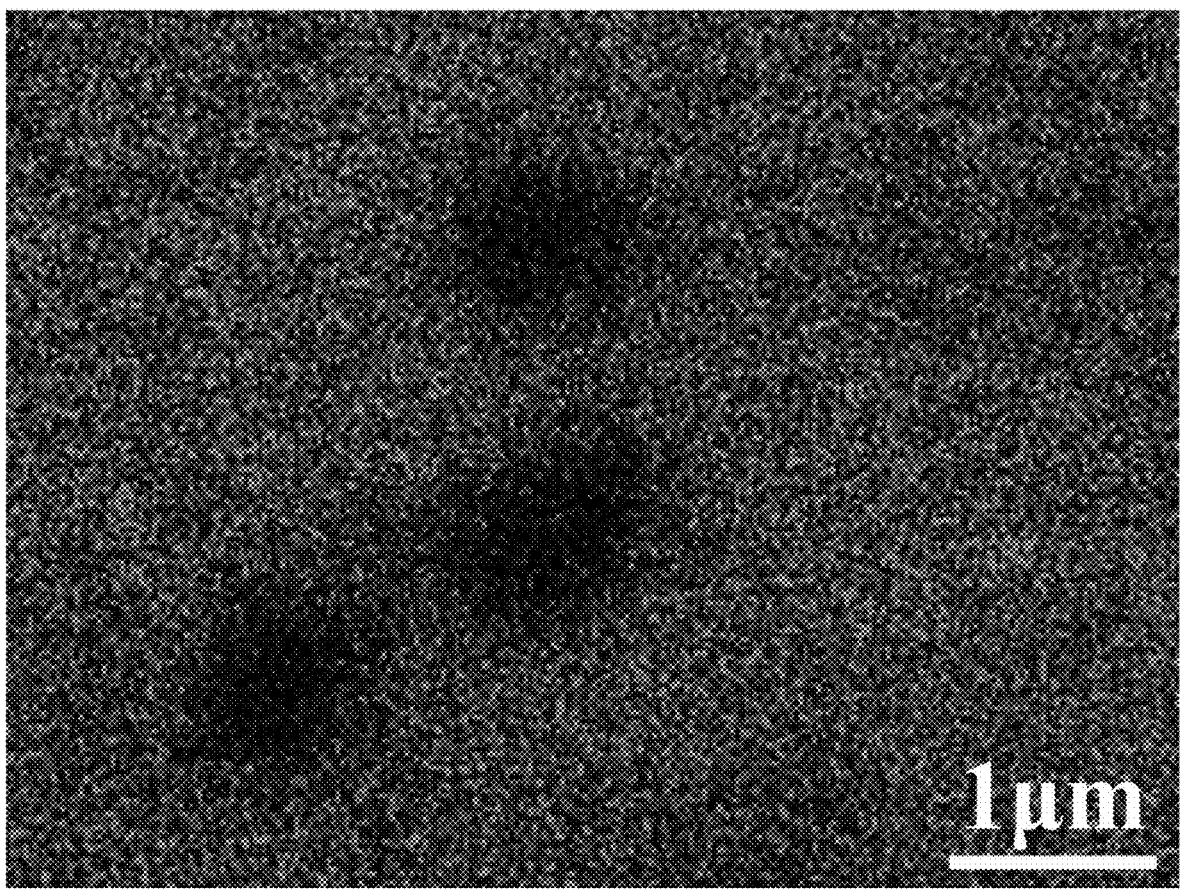
Figure 2D:
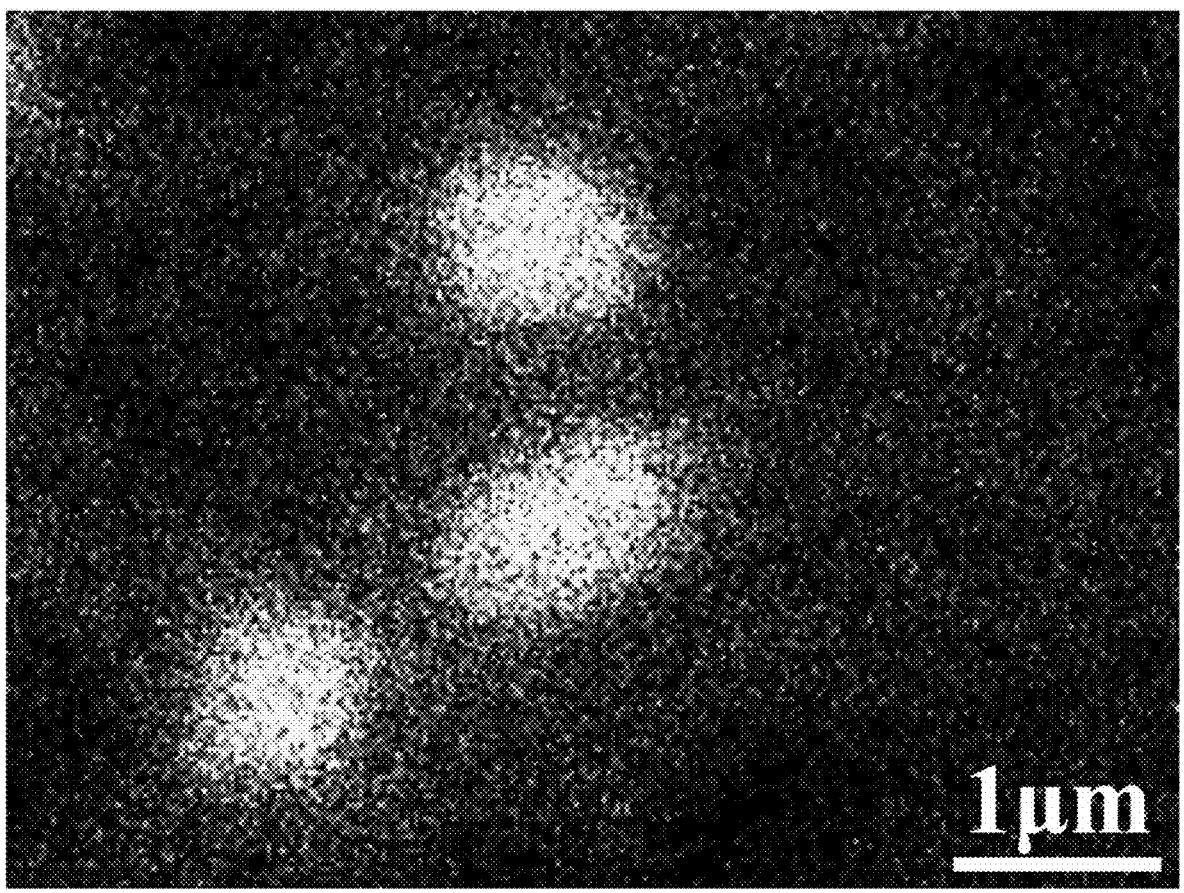

FIG. 2A, FIG. 2B, FIG. 2C and FIG. 2D illustrate results of scanning electron microscope (SEM) analysis of a 0.85$(Bi_{0.5}Na_{0.5})TiO_3$-0.11$(Bi_{0.5}K_{0.5})TiO_3$-0.04$BaTiO_3$-0.3ZnO at x=0.3 in Embodiment 2, where FIG. 2A shows morphological phases, FIG. 2B shows Ti elemental distribution, FIG. 2C illustrates Bi elemental distribution, and FIG. 2D illustrates Zn elemental distribution.

It can be seen from the figure that the ZnO-rich regions are isolated in the BNKT-BT substrate, forming a 0-3 composite structure (a piezoelectric ceramic specific structure).

Figure 3A:
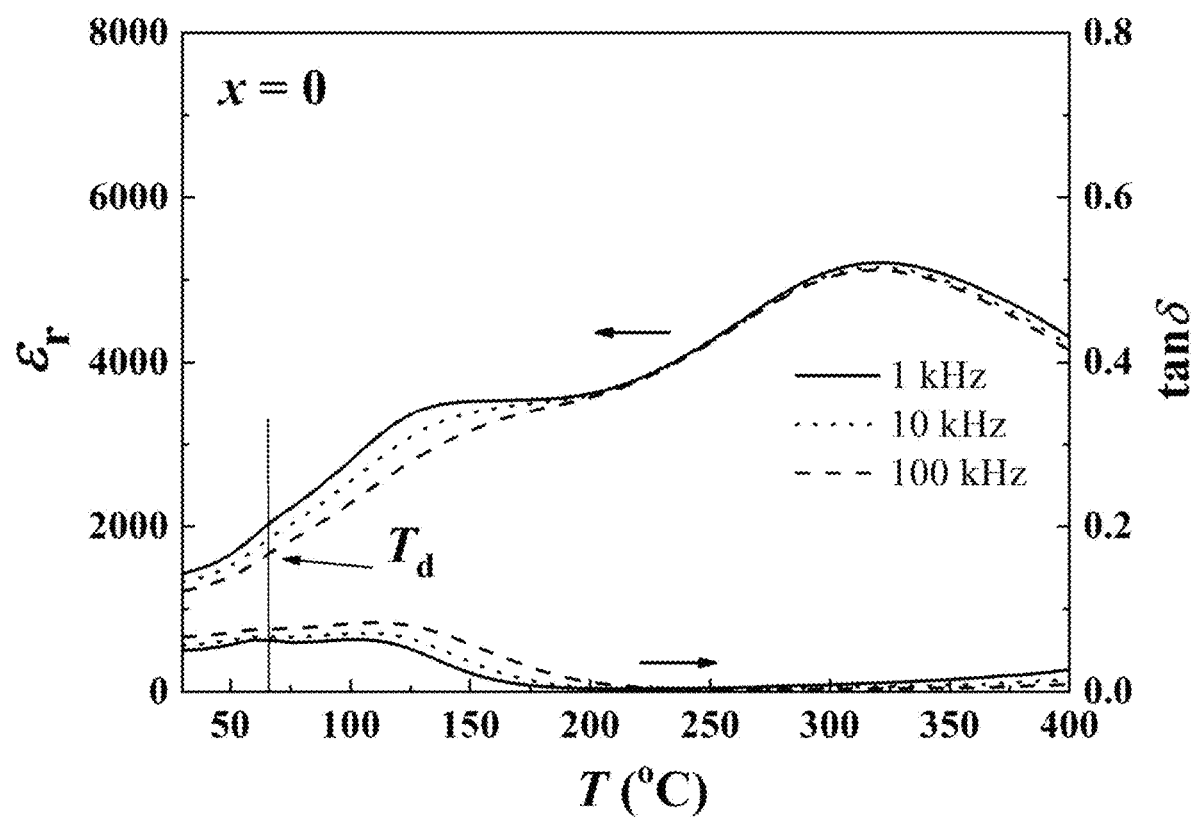
FIG. 3A, FIG. 3B, FIG. 3C and FIG. 3D respectively show dielectric temperature spectrum and loss spectrum of the composite ceramic materials prepared in Embodiments 1-3 and Comparative embodiment 1 under alternating current loading of different frequencies, where the temperature at which a first dielectric abnormal peak appears corresponds to a depolarization temperature $T_d$ of a substrate.
Figure 3B:
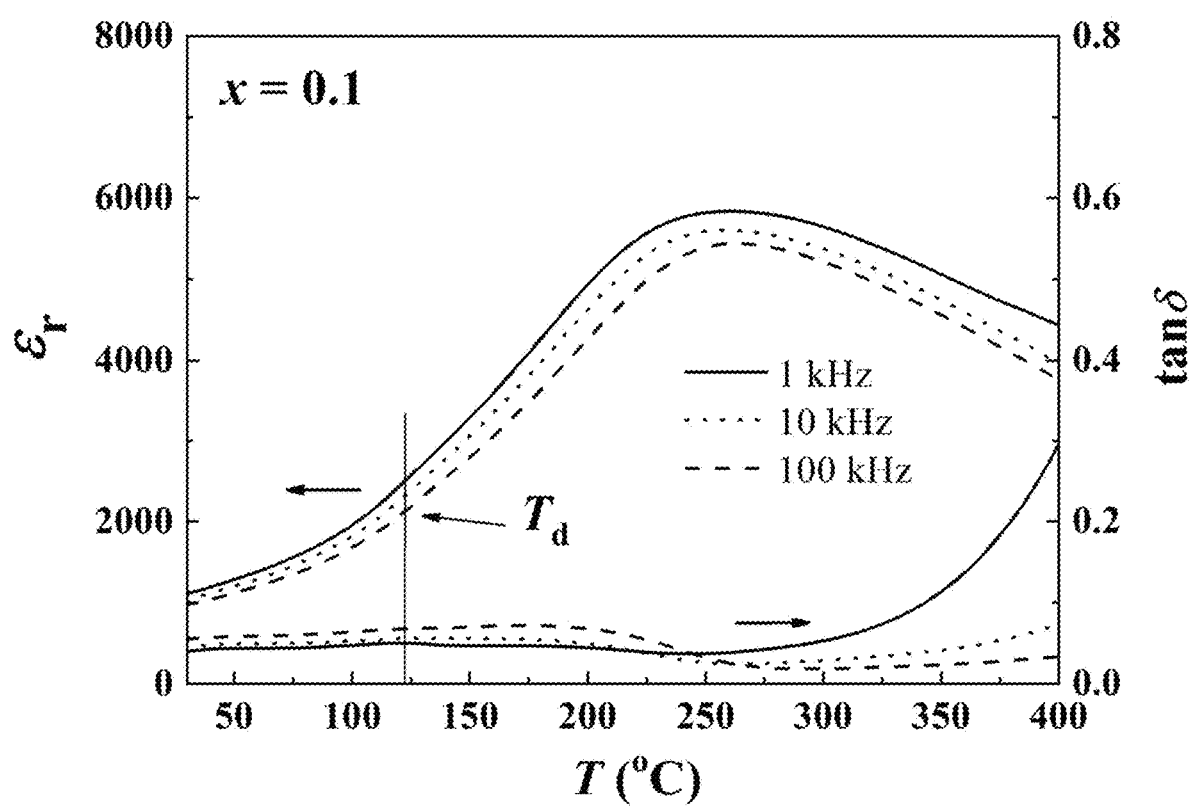
Figure 3C:
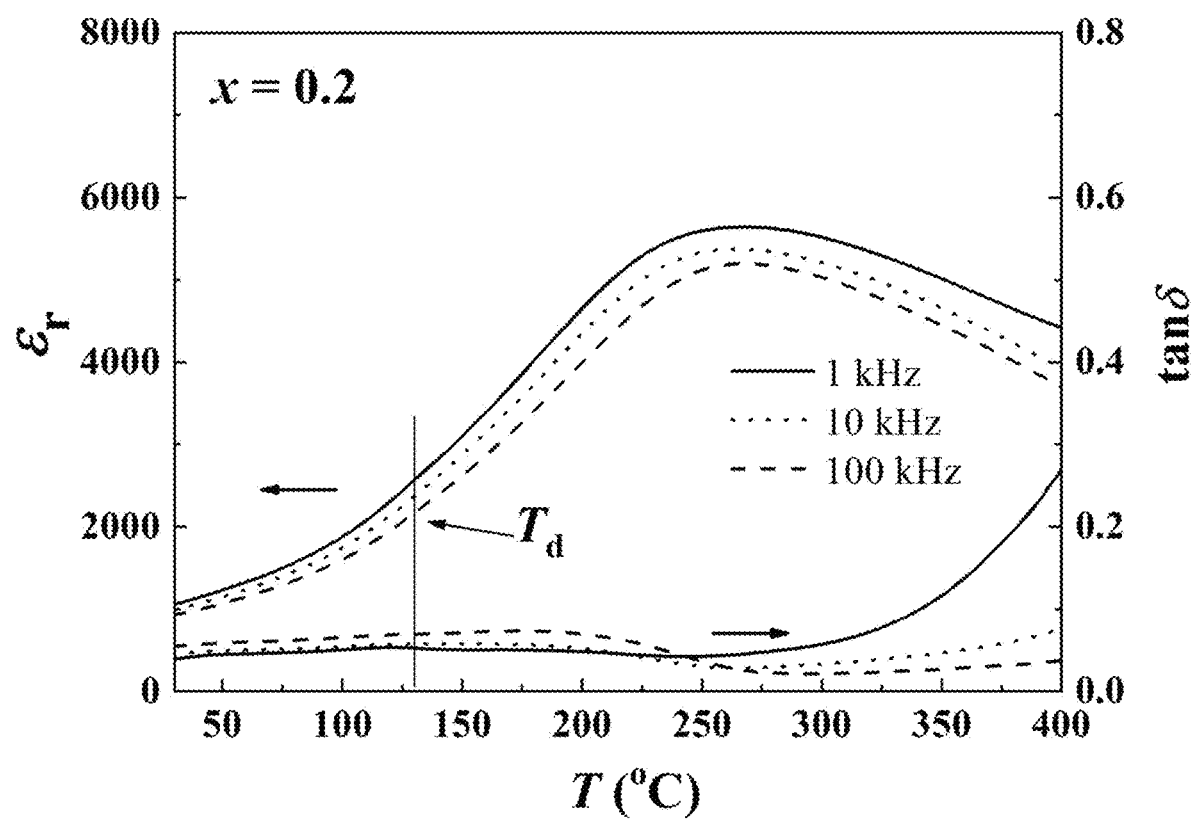
Figure 3D:
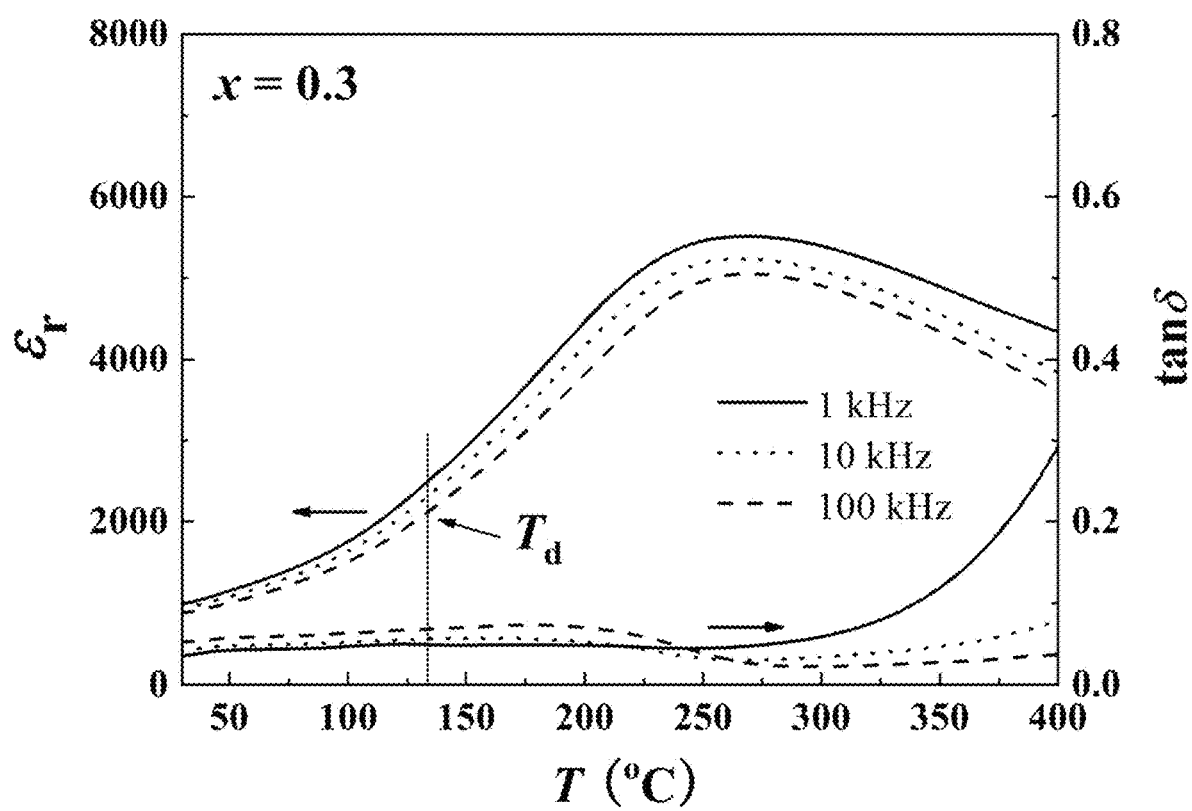

FIG. 3A, FIG. 3B, FIG. 3C and FIG. 3D show the dielectric temperature spectrum and loss spectrum of composite ceramic materials under different frequency alternating current loading when x=0, 0.1, 0.2 and 0.3, in which the temperature at which the first dielectric abnormal peak appears corresponds to the depolarization temperature $T_d$ of the substrate; specifically, FIG. 3A shows the dielectric temperature spectrum and loss spectrum of composite ceramic material under different frequency alternating current loading when x=0, and FIG. 3B shows the results when x=0.1, FIG. 3C shows that when x=0.2, and FIG. 3D shows that when x=0.3 (the upper curve is the dielectric constant $\varepsilon_r$ denoted by the arrow, the lower curve is the loss tan δ denoted by the arrow and $T_d$ is the depolarization temperature).

Figure 4:
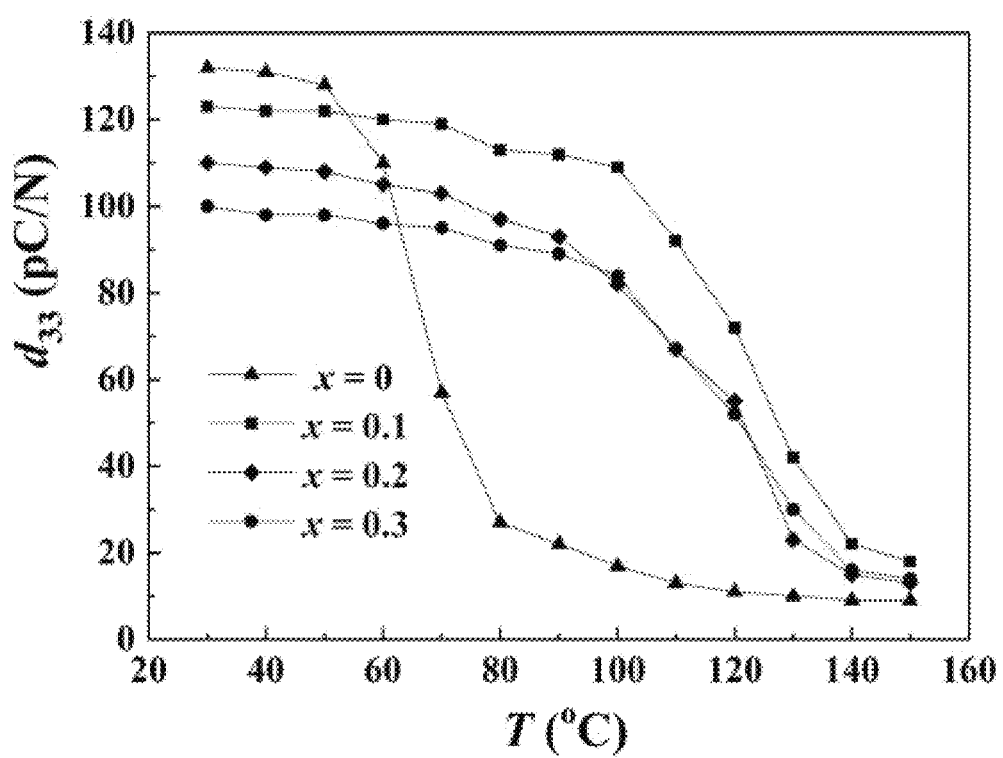
FIG. 4 is a graph showing variations of a piezoelectric constant $d_{33}$ against annealing temperature of the composite ceramic materials prepared in Embodiments 1-3 and Comparative embodiment 1.

FIG. 4 is a graph showing variations of a piezoelectric constant $d_{33}$ against annealing temperature of the composite ceramic materials prepared when x=0, 0.1, 0.2 and 0.3.

As can be seen from FIG. 3A-FIG. 3D and FIG. 4, the depolarization temperature of the composite ceramic materials prepared in Embodiments 1-2 of the present application is above 120° C.; the piezoelectric constant $d_{33}$ under room temperature is 123 picocoulombs per Newton (pC/N) when x=0.1 when x=0.1, with a depolarization temperature of 122° C., the piezoelectric constant $d_{33}$ under room temperature is 110 pC/N when x=0.2 with a depolarization temperature of 127° C., and the piezoelectric constant $d_{33}$ under room temperature decreases to a certain extent when x=0.3, only 100 pC/N, while the depolarization temperature increases slightly to 134° C. As compared to Embodiment 1 and Embodiment 2, the piezoelectric constant $d_{33}$ at room temperature is higher at 132 pC/N when x=0, but the depolarization temperature is only 68° C.

The depolarization behavior of the composite ceramic materials prepared in Embodiments 1-3 of the present application is obviously improved, and $d_{33}$ remains relatively stable below 110° C.

Comparative Embodiment 2

Same as Embodiment 1, with the difference that the ZnO nanoparticles are replaced by niobium oxide.

The results show that the depolarization temperature of the composite ceramic material is only 110° C., and the piezoelectric constant $d_{33}$ at room temperature is 98 pC/N.

Comparative Embodiment 3

The difference from Embodiment 1 is that the ball milling method in step 1) is altered to stirring and mixing.

It is found that the depolarization temperature of the prepared composite ceramic material is only 53° C. and the room temperature piezoelectric constant $d_{33}$ is 70 pC/N.

All the above mentioned are only preferred embodiments of the present application and are not intended to limit the present application. Any modifications, equivalent substitutions, improvements, etc. made within the spirit and principles of the present application shall be included within the scope of protection of the present application.

What is claimed is:

1. A preparation method of a bismuth sodium potassium titanate-barium titanate (BNKT-BT)-based composite ceramic material comprising a chemical general formula of:

$0.85(Bi_{0.5}Na_{0.5})TiO_3\text{-}0.11(Bi_{0.5}K_{0.5})TiO_3\text{-}0.04BaTiO_3\text{-}xZnO$, wherein 0.1≤x≤0.3 with high depolarization temperatures, the preparation method comprising:
S1, mixing a bismuth source, a sodium source, a potassium source, a titanium source and a barium source according to a stoichiometric ratio, ball milling with an organic solvent as a medium, drying and dry-pressing for molding to obtain a raw material block;
S2, pre-sintering the raw material block in an oxygen atmosphere to obtain a BNKT-BT pre-sintered block;
S3, mixing the BNKT-BT pre-sintered block with ZnO nanoparticles according to the stoichiometric ratio, performing secondary ball milling, drying, adding adhesive, standing, and pressing to obtain a sample;
S4, grinding the pressed sample and sieving to obtain powder, and then re-pressing the obtained powder to obtain a ceramic blank;
S5, sequentially heating, sintering, grinding and polishing the ceramic blank to obtain ZnO composite BNKT-BT-based ceramics; and
S6, coating silver paste on a surface of the ZnO composite BNKT-BT-based ceramics, and performing silver-firing to obtain BNKT-BT-based composite ceramic material with high depolarization temperatures.

2. The preparation method of the BNKT-BT-based composite ceramic material with high depolarization temperatures according to claim 1, wherein the dry-pressing in the S1 is carried out under a pressure of 400 Mpa for a duration of 1-3 minutes.

3. The preparation method of the BNKT-BT-based composite ceramic material with high depolarization temperatures according to claim 1, wherein the pre-sintering in the S2 is carried out under a temperature of 820-850° C. for a duration of 3-4 hours.

4. The preparation method of the BNKT-BT-based composite ceramic material with high depolarization temperatures according to claim 1, wherein the ZnO nanoparticles in the S3 are in a diameter of 50-80 nm.

5. The preparation method of the BNKT-BT-based composite ceramic material with high depolarization temperatures according to claim 1, wherein in the S3, the adhesive is a 5 wt % polyvinyl alcohol adhesive; the standing is lasted for 12-15 h, and the pressing to obtain the sample is carried out under pressure of 600 Mpa for a duration of 3-6 minutes.

6. The preparation method of the BNKT-BT-based composite ceramic material with high depolarization temperatures according to claim 1, wherein the re-pressing in the S4 is carried out under a pressure of 400 Mpa for a duration of 1-3 minutes.

7. The preparation method of the BNKT-BT-based composite ceramic material with high depolarization temperatures according to claim 1, wherein in the S5, the heating comprises a temperature of 550° C. and a duration of 2-3 hours; and the sintering comprises a temperature of 1,030-1,070° C. and a duration of 1-1.5 h, with a heating rate of 9° C./min.

8. The preparation method of the BNKT-BT-based composite ceramic material with high depolarization temperatures according to claim 1, wherein the silver-firing in the S6 is carried out under a temperature of 550-600° C. for a duration of 40-50 minutes.

* * * * *